Figure 1:
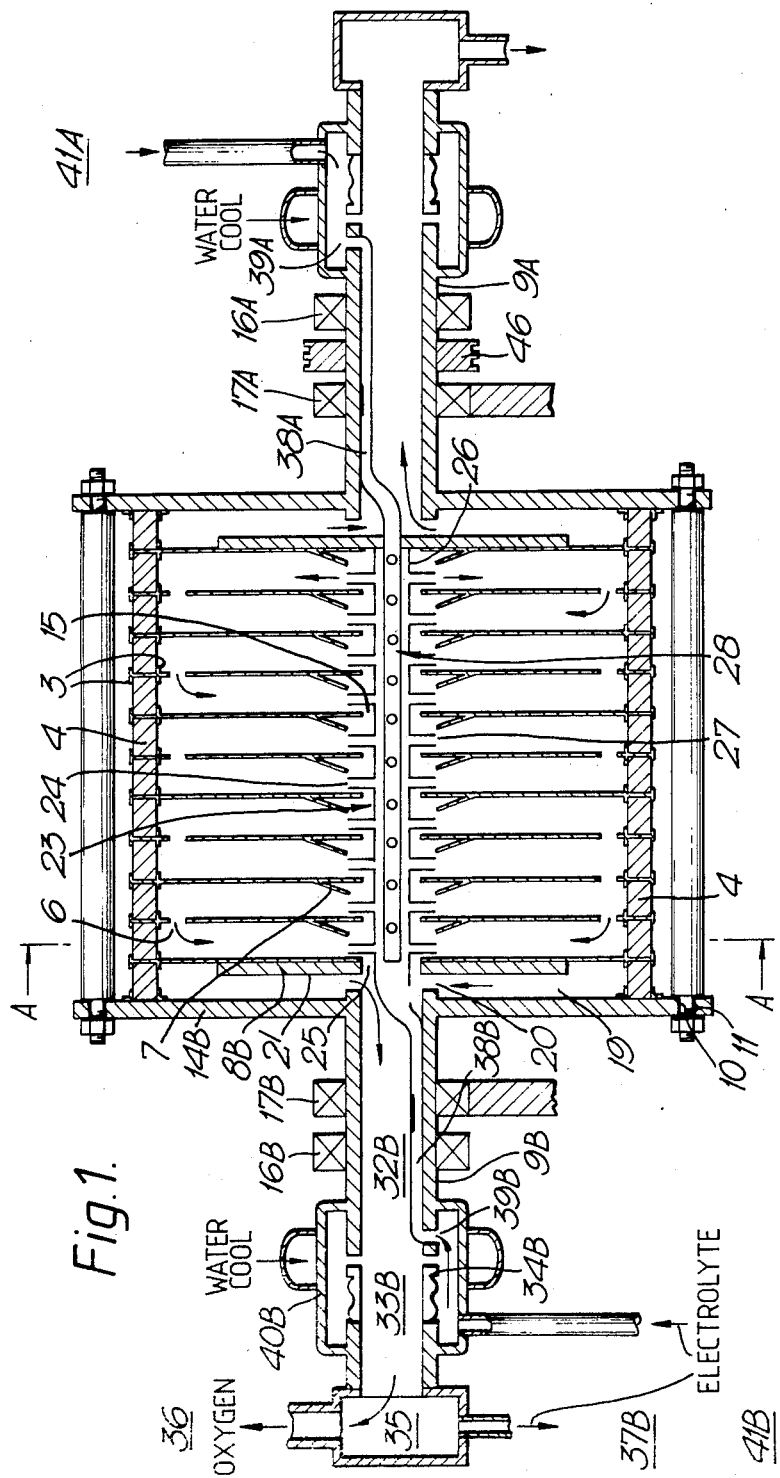

United States Patent [19]

Ramshaw

[11] Patent Number: 4,931,166
[45] Date of Patent: Jun. 5, 1990

[54] ELECTROCHEMICAL CELL

[75] Inventor: Colin Ramshaw, Norley, United Kingdom

[73] Assignee: Imperial Chemical Industries PLC, London, England

[21] Appl. No.: 322,716

[22] Filed: Mar. 13, 1989

[30] Foreign Application Priority Data

Mar. 14, 1988 [GB] United Kingdom ............... 8805991

[51] Int. Cl.[5] .................. C25D 17/00; C25D 21/00; C25C 7/00
[52] U.S. Cl. ................................. 204/212; 204/268; 204/269; 204/275
[58] Field of Search ............... 204/212, 268, 269, 273, 204/275

[56] References Cited

U.S. PATENT DOCUMENTS

| | | | |
|---|---|---|---|
| 2,839,463 | 6/1958 | Vellas et al. | 204/212 |
| 3,119,759 | 1/1964 | Hoover | 204/212 |
| 3,196,095 | 7/1965 | Wadsworth | 204/212 X |
| 3,825,484 | 7/1974 | Fronsman et al. | 204/212 X |
| 4,770,753 | 9/1988 | Ramshaw | 204/212 |

Primary Examiner—Donald R. Valentine
Attorney, Agent, or Firm—Cushman, Darby & Cushman

[57] ABSTRACT

An electrode assembly for organic electrosynthesis (and a cell cascade comprising a plurality of such assemblies) for electrochemical reaction between a liquid first phase and a liquid (organic) second phase. The assembly comprises a non-permeable, electrically charged, rotated electrode, in use in contact with the first phase, to which the second phase is charged, and the reaction product of the two phases is removed from the electrode. Also, a process using the assembly or cascade.

4 Claims, 3 Drawing Sheets

ELECTROCHEMICAL CELL

This invention relates to an electrode assembly for electrochemical reactions, to a cell cascade comprising a plurality of such assemblies, and to electrochemical processes using such an assembly or cascade.

Inter-phase electrochemical reactions between one liquid in a thin film moving radially outwards on a spinning electrode and another are known, for example in organic electrosynthesis. Such electrosynthesis is often useful in enabling some reactions under conditions less extreme than conventionally necessary (for example nucleophilic attack on nucleophilic aromatic nuclei) and in enhancing reaction specificity. Disadvantages of spinning electrode electrosynthesis include the low throughput rate of a single such electrode, the consequent high bulk to throughput ratio of all such systems, and problems of organic product-electrolyte separation which can occur. We have now found a means for unexpectedly diminishing at least some of the above problems, and in particular an apparatus which achieves a higher throughput to bulk ratio.

Accordingly the present invention provides an electrode assembly for an electrochemical cell effecting electrochemical reaction between two liquid phases comprising an electrode, impermeable to the two phases, means for containing the first phase in contact with the electrode, means for charging the second phase to the electrode, and means for removing a reaction product of the two phases from the electrode, which apparatus is characterised by means for rotating the assembly about an axis, such that when the second phase is charged to the electrically charged, rotating electrode in contact with the first phase, the second phase moves across the electrode from the point of charging and the reaction product is removed from the electrode.

The present invention also provides a cell cascade comprising a plurality of the present electrode assemblies in an axially extending array, in particular a bipolar series cell cascade.

Where, as is often the case in use of the electrode assemblies and/or electrochemical cell cascades of this invention, reaction occurs between an aqueous electrolyte first liquid phase and an organic second liquid phase and an organic product dissolves and/or disperses mutually with the organic second phase to give a product phase which is of different density to the first, this enables the latter to be tapped off conveniently through radially separate outlet means, and the product separated and the organic phase recycled. Similarly, where the product is a gas such as carbon dioxide, it may be tapped off conveniently through radially inward outlet means. The practical impossibility of conveniently doing either with a conventional spinning electrode has been one factor preventing the desirable application of the latter in processes on an industrial scale.

Accordingly, the invention further provides a process for effecting electrochemical reaction between a first liquid phase and a second liquid phase in an electrode assembly comprising an electrode impermeable to the two phases, means for containing the first phase in contact with the electrode, means for charging the second phase to the electrode, and means for removing a reaction product of the two phases from the electrode, by rotating and electrically charging the electrode, containing the first phase in contact with the electrode and charging the second phase to the electrode, characterised in that the process is an industrial scale process and the whole electrode assembly is rotated.

Any agitation of the liquid boundary layer between the liquid phases will tend to stimulate good inter-phase mass transfer, which may often improve reaction yields. Such agitation may be caused by the acceleration of the phases in the centrifugal field in operation, and is also often enhanced by higher speeds of rotation of the electrode assembly within the limits discussed further hereinafter. Agitation may also be caused if e.g. the electrode reaction produces a gaseous product inert to further reaction (for example excess hydrogen at a cathode where interphase reaction is occurring).

The present apparatus has further advantages, however. In general, if a reaction is driven harder by increasing the energy input density, e.g. by operation at higher current densities in electrochemical reactions, this often leads to a loss of reaction selectivity or specificity as side-reactions start to compete disadvantageously. Operation is often a compromise between a reasonable throughput and reasonable selectivity. Surprisingly, we have now found with the present apparatus that by operating at higher current densities (other reaction parameters remaining the same) the selectivity or reaction can often be improved at the same time as the throughput.

The first liquid and/or the second liquid may be pure or may be a solution of one or more solutes in the liquid, which solute may be a gas, liquid or solid, subject always to the proviso that the two phases are capable of electrochemical reaction.

Examples of such processes include the electrohydrodimerisation of acrylonitrile using the electrode assembly of the present invention, as described hereinafter, and the following:

The second liquid may be an alkene, the first liquid may be a solution of (solid) sodium chloride in water, and the electrode may be an anode. In this case the reaction (an electrosynthesis) will be the reduction of chlorine or chloride ion to halogenated alkanes which may be removed.

In a further possibility, one or two electrodes in accordance with the invention may be used (as a cathode, or as a cathode and anode respectively) in a fuel cell.

For example, an anode in accordance with the present invention may be charged with a hydrocarbon such as a $C_{5-8}$ alkane or a mixture thereof which is anodically oxidised to carbon dioxide or other oxidation products.

Conventional impermeable (e.g. plate) electrodes may be used in the present invention.

Any given reagent system and the desired product may impose constraints on the choice of electrode material, and clearly at least a part of the electrode must be electrically conductive. Within such constraints, the electrode may be formed from any material or combination of materials with the mechanical strength and creep resistance to withstand the stress generated in the electrode by rotation at the desired operational speeds (described further hereinafter). Preferably it is resistant to attack or corrosion by or non-catalytic reaction with the reagent liquids in contact with it, although the skilled man will appreciate that the choice of any electrode material, especially on in contact with the reagent phases, is often one of the factors which determines the selectivity or specificity of an electrochemical reaction. Within any such constraints on the choice of electrode material, the electrode may be formed of a single material or be a composite of two or more materials in an appropriate disposition in or on another, and may be chosen from any of the following materials or combination thereof:

carbon and any metal, metal mixture (e.g. doped metal) or alloy which is chemically resistant to the chosen reagent system, such as stainless e.g. titanium steels;

any metal, metal mixture (e.g. doped metal) or alloy which may be electro-catalytic to the chosen reagent system, such as lead, silver, cadmium, tin, copper, nickel, titanium, rhodium, niobium, tantalum, platinum and palladium, and mixtures and alloys thereof, e.g. metal amalgams and lead doped with about 1% silver;

carbon or a metal coated with a conventional electrode coating, including any of the above metals, metal mixtures and alloys and metal oxides, which may be in finely divided and optionally electro-catalytic form, such as platinum black, palladium black, and particulate platinum or palladium oxide; and any conductive or conductively coated plastic or ceramic which may be coated with one of the above coating materials.

It may often be desirable for the electrode to be in the form of a desired e.g. corrosion resistant and/or catalytic coating on a corrodable and/or catalytically inert material, especially where the former material is significantly more expensive or of lower mechanical strength than the latter.

It may also be desirable to make the whole electrode relatively thin, to reduce constructional costs (as mentioned above), to increase the proportion of a cell taken up by the electrode, so as to increase the possible throughput for a given overall cell size and to increase cell compactness (especially in the cell cascade of the present invention), to reduce the rotational moment of inertia of the electrode assembly and so to reduce operational start-up loads (again, especially in the cell cascade of the present invention), and to reduce through-electrode resistance (e.g. in the present bipolar series cell cascade). The electrode may be so thin (e.g. as a sheet or foil) that, although it is cohesive under operational conditions, it is not mechanically self-supporting.

Regardless of the electrode thickness, means to retain the electrode in a desired position in the assembly will be desirable; for thinner flexible electrodes, means which also retain the electrode in a desired shape will be desirable, and indeed necessary where the electrode is so thin that it is not mechanically self-supporting.

The means is preferably in the form of at least one member, the or each member forming part of the electrode assembly so that it is rotatable about the same axis as the electrode.

Members of the foregoing type are referred to as "rotatable members" herein). The electrode is retained in position and/or shape by one rotatable member or two or more members in cooperation.

The member or members may also or alternatively form part of means for containing the first liquid phase in contact with the electrode, for example an electrode chamber to contain and/or channel the first and/or second liquids.

The electrode may also form at least part of the containing means; for example it may form a wall of the electrode chamber.

The electrode may e.g. be in the form of a rectangular plate which is rotated about an axis perpendicular to the plate and distant from the plate mid-point. The electrode may be in the form of a rectangular plate which is rotated about an axis perpendicular to the axis of the plate and co-incident with the mid-point thereof. More preferably the electrode is e.g. in the form of a disc or an annulus which is rotated about its central axis, so that the electrode is dynamically balanced. Where the electrode is a disc or an annulus the outer diameter of the annulus is typically in the range 250 mm to 1.25 meters; the inner diameter of an annulus is typically in the range 50 mm to 60 mm.

The electrode will conveniently be planar or slightly dished.

The rotation axis may be horizontal or vertical or at any angle between; it is often convenient to have the axis horizontal. Where an electrode in the form of an annulus is employed, rotary movement typically is applied to it by a shaft projecting from the plane of the annulus along the axis thereof. The electrode may be rotated by, for example, a variable speed fluid drive, a pulley which may be belt driven from an electric motor, or by turbo-propulsion.

Simple experiment will readily reveal a suitable electrode for any desired rotational speed, fluid combination and reaction system.

Any rotatable member will generally have or comprise a similar form to the electrode. Preferred forms and the reasons therefor will be as described for the electrode hereinbefore. Thus where the electrode is an annulus or disc, and maybe mechanically self-supporting, or the diameter of the electrode assembly is relatively small, the assembly will often comprise a rotatable member which is or comprises an annular gasket co-extensive with the periphery of the electrode and by which such an electrode is clamped axially against but spaced from e.g. another such disc, which may e.g. be the other electrode of the cell in which the present electrode assembly is used, or a cell membrane (discussed further hereinafter).

Where the electrode is not mechanically self-supporting, e.g. it is a sheet or foil, or the diameter of the electrode assembly is relatively large, the means to retain an annular electrode position and/or shape generally is or comprises a similarly clamping annular gasket co-extensive with the inner periphery of the electrode, and any other gasket structure e.g. a lattice which clamps the electrode, yet allows the necessary fluid flows through the electrode chamber to occur. Similar considerations will apply in the case of any other assembly components which are not self-supporting, e.g. cell membranes, as discussed further hereinafter.

As noted above at least part of such means for retaining the electrode (or other components), e.g. at least some of the foregoing gaskets, will often also form at least part of the means for retaining the first phase in contact with the electrode. The other electrode of the cell in which the present electrode is used may also form part of this retaining means.

Each part of the retaining means may be constructed of any material or combination of materials which has (a) the mechanical strength and creep resistance to withstand the stress generated in the material during desired rotational speeds in operation, and (b) the necessary resistance to corrosion in its operational environment.

Typical materials from which each rotatable member may be constructed as a composite of two or more materials in an appropriate disposition or a single material include inter alia plastics which are not degraded in the electrode environment, such as halogenated or some halogenatable polymers such as PVC, chlorinated PVC, chlorinated rubbers and chloroprene rubbers and PTFE composites, and some engineering plastics such as ABS. The material of any part of the rotatable member will also be determined by its other functions, e.g. whether it needs to be non-conductive. The member may in addition comprise conventional fibrous reinforcement. Suitable materials will be apparent to the skilled man. It may often be desirable to make any such rotatable member which is a gasket relatively thin, e.g. down to 0.5 mm under compression, to reduce cell resistance, as discussed further hereinafter.

Any other electrode (e.g. an anode) in the cell comprising the present electrode may be of the same type of materials as the present electrode, e.g.

any metal, metal mixture (e.g. doped metal) or alloy which is chemically resistant to its electrolyte, such as stainless e.g. titanium steels or, in milder electrolytes, mild steels;

any metal, metal mixture (e.g. doped metal) or alloy which may be electro-catalytic such as lead, silver, cadmium, tin, copper, nickel, titanium, rhodium, niobium, tantalum, platinum and palladium, and mixtures and alloys thereof;

and any conductive or conductively coated plastic or ceramic, which may be coated with e.g. a conventional electrode coating, including any of the above metals, metal mixtures and alloys and corresponding metal oxides, which may be in finely divided and optionally electro-catalytic form, such as palladium oxide.

In the electrode assembly of the present invention, the first liquid phase will often be a bulk aqueous electrolyte solution, which essentially fills the means for containing it in contact with the electrode, e.g. an electrolyte chamber formed by one or more electrodes and a rotatable member as described hereinbefore. It will generally be the main (ionic) transporter of electrical current in the process of the present invention, i.e. it will have a higher electrical conductivity than the second liquid phase (see below), and additionally will often have a higher specific conductivity. It will generally take part in the electrochemical reaction of the present invention by providing one or more ionic species which are discharged at the electrode to react with the second liquid phase.

The second liquid phase will often comprise an organic reagent, and when charged to the rotating electrode, spreads out across it, preferably in a thin film. It will generally be a non-ionic material, or if ionic will be an indifferent ionic current conductor (comprising ions of low transport number, and being of low specific conductivity) relative to the first liquid phase.

It may comprise only one organic species, and this may just react in an inter-phase electrochemical reaction with a species from, or produced at the electrode from, the first liquid phase, as both phases move radially outwards across the rotating electrode. It may in the same electrode process itself also lose or acquire electrons to form reactive e.g. radical species which react with the species or products from the first phase, or react mutually (e.g. in dimerisation). The organic phase may comprise two different organic species which also react mutually.

The desired product of the electrosynthesis will often also be organic, and like the second liquid phase will generally be non-ionic or, if ionic, of indifferent conductivity. It will often tend to be (mutually) soluble in the second (generally also organic) liquid phase, and immiscible with the first aqueous phase. Overall molar conversion rates of at least 80%, and often at least 90%, may often be achieved in the process of the present invention. Thus, once steady state operating conditions have been established in the present assembly, with any recycling of the organic phase which may be necessary, there will often be a single organic phase crossing the electrode, which at the outlet for the phase will consist of (a solution of) substantially pure desired product, with any residual second liquid in a fluid combination e.g. (mutual) solution or (mutual) dispersion with the organic product phase.

Specific examples of both reagent phases and inter- and intra-phase reactions and products are further described hereinafter.

The two reagent phases and any product will tend to flow radially in the process conditions of the present invention. The radial direction of either reagent phase and of any product phase will be determined by the density of that phase relative to any other (liquid) phase present in the reaction mixture, as will its rate of flow in any radial direction relative to those other phases.

In theory, the present apparatus could be operated with suitable and routine choice of the first and second phases, both as initially charged to the electrode and, as apt, when enriched with, or substantially converted to, product (in respect of their radial flow velocities and/or of the speed of rotation) to give co- or counter-current flow of the initial reactant phases, the desired product phase, and/or any reagent phase enriched with that product, through the present electrode assembly.

The first (generally aqueous) liquid phase will often tend to flow radially outwards. Where the second liquid phase is a denser organic liquid it will tend to flow radially outwards at a greater rate. If the organic reaction product is also denser, or dissolves or disperses mutually with the organic second phase to give a 'product phase' which is denser than the first, aqueous phase, the product will also tend to flow radially outwards at a greater rate than the first phase. This will lead to dynamic separation of the first, aqueous phase and the product phase, which is often useful in enabling the latter to be tapped off conveniently through radially more outward outlet means.

Where the second liquid phase and/or the product or the product phase are less dense than the first, aqueous phase, each such less dense phase will tend to flow radially outwards at a lesser rate than the first phase, with the consequent dynamic separation of the first and other less dense phases (This system is hereinafter "Embodiment A"). These latter may be tapped off conveniently through radially more inward outlet means.

In both cases separation of the more and less dense phases is facilitated and enhanced by maximising their density difference. Separation of the various phases is also often facilitated and enhanced by higher speeds of rotation of the electrode assembly, insofar as this and the radial dimension of the electrode are compatible with an adequate residence time of the two reactant liquid phases in contact with the electrode. This latter proviso may be routinely ascertained by simple trial; the typical assembly speeds given hereinafter are believed suitable for the majority of reactions to which the present apparatus is applicable. However, relevant parameters such as reaction rate will vary widely and specifically, and the figures given are not to be taken as limiting.

Additionally, inter-phase reaction at the electrode or at the other electrode of the relevant cell (of which the present electrode assembly forms part) may produce a gaseous product inert to further reaction. Under the rotation this product will tend to flow radially inwards. Rotation thus advantageously removes such gaseous products from the electrode(s), and tends to reduce any polarisation potential arising from gas bubble adherence to the electrode(s), and thus reduce overall energy consumption for the process.

As noted hereinbefore, gas bubbles at the present electrode cause agitation of the boundary layer between the reagent phases. In Embodiment A such agitation is enhanced by the accelerated radially inward flow of the bubbles within the electrode assembly which is counter-current to the two reagent liquid phases.

It may be possible that this stimulates much better inter-phase mass transfer. This may often further improve reaction yields.

Examples of such processes include the production of excess cathodic hydrogen in the electrohydrogenation of unsaturated species such as acrylonitrile.

The other electrode of the cell which comprises the present electrode assembly will often be inert in the desired preparative process. However, a gaseous product may of course in some cases also be produced at that electrode.

It may be feasible to charge a suitable reactant to this other electrode (especially when the cell is divided into catholyte and anolyte compartments as described hereinafter), giving a product which is not a gas, e.g. in particular it is a solute in the electrolyte in contact with that electrode, thereby reducing or removing the overpotential of the original gaseous product from the total energy requirements of the process. This electrolyte may be the same as or different from the first liquid phase in the process of the present invention. The reactant may be a gas, as in the following: e.g. it may be hydrogen at an anode, so that water is produced rather than oxygen, or oxygen/air at a cathode, so that water is produced rather than hydrogen.

Where the reactant is likely to undergo unwanted side reaction with the desired organic product at the electrode of the present invention, this other process should of course be isolated e.g. by being effected in a separate electrode chamber, e.g. defined in part by a conventional membrane.

Such reaction may be effected using an electrode assembly for the other electrode of the type described in EP-A. No. 207630.

The process may be enhanced by the use of conventional electrode coatings, e.g. electrocatalytic coatings.

Such a process can also be used in conjunction with a gaseous side-product at the electrode of the electrode assembly of the present invention, provided that there is no undesired side reaction with the desired organic product. In such case the beneficial agitational effect provided by the original gaseous product may be provided instead by a gaseous reactant, whilst (desirably) removing the gaseous side-product overpotential.

Where, as is usual, Embodiment A is employed, it will be appreciated that means are necessary, preferably adjacent to the axis of rotation to charge the electrode with the second liquid phase. Such charging means typically comprise at least one charging orifice in a radially inner wall of an electrode chamber formed by one or more electrodes and/or one or more rotatable members, or at least one charging pipe in an equivalent position.

Preferably the charging orifice or pipe communicates with a charging space extending axially through or with respect to the electrode assembly, for example as part of the interior of a hollow shaft (which also serves to rotate the electrode assembly). The second fluid may be supplied conventionally (e.g. pumped) to the charging space.

In the electrode chamber formed by one or more electrodes and one or more rotatable members as described hereinbefore, there is also provided discharge means for removing a reaction product of the two phases which is not dissolved or dispersed in the first, aqueous phase and may be mutually dissolved or dispersed in unreacted excess of the second, organic phase. This is conveniently at least one discharge orifice in an electrode chamber wall at a radially outer position, for example in a peripheral or axial wall.

In Embodiment A this is conveniently at least one outlet orifice in an electrode chamber axial wall at a position radially inward of outlet means for the first liquid phase described hereinafter, but towards the periphery of the chamber, or a pipe extending to such a position.

Preferably the discharge means for the organic product communicates from the electrode chamber to a discharge space extending between the discharge means and an axial conduit, for example at least in part as the interior of a hollow drive shaft and adjacent to or coaxial with the above-mentioned charging space. The discharge space may thus be or comprise an annular space or radial trunking.

As noted above, in practice, the present apparatus is generally operated with suitable and routine choice of the first and especially the second flow rates for reagent phases and other reaction parameters such that not all the second phase reacts in its passage across the electrode. The product may be separated from the collected product phase after passing through the discharge space in a batch process, the product phase may be recycled several times for reaction in a semi-batch process, or unreacted second phase may be separated off continuously and added to fresh second phase feedstock and the whole recycled continously through the electrode assembly of the present invention. The last mentioned is described specifically hereinafter.

Similarly where an inert gaseous product arises from the cell, a gas outlet means for removing that product is necessary, conveniently at least one gas outlet orifice in an electrode chamber wall at a radially inner position.

Even if the first phase is not depleted or diluted by the reaction and thus require continual replenishment, it may be depleted by entrainment with the liquid reaction product, second liquid phase and/or gaseous reaction product leaving the electrode and/or its chamber. Any of the foregoing necessitates means to deliver the first liquid to the electrode which also typically comprises at least one delivery orifice in an electrode chamber radially inner wall through which the liquid may flow, or again at least one delivery pipe in an equivalent position.

Again the delivery means preferably communicates with a delivery space extending axially of or through the electrode assembly, for example as part of the interior of a hollow driveshaft, and adjacent to or concentric or coaxial with the abovementioned charging space.

Where there is such replenishment of the first phase it is often convenient to continually cycle the first phase. In this case there is also provided outlet means for removing excess and/or spent or diluted first phase.

Preferably the outlet means communicates with an outlet space extending between the outlet means and an axial conduit for example the interior of a hollow driveshaft, the axial conduit being coaxial with or adjacent to charging, discharging and/or delivery spaces. The outlet space may thus be or comprise an annular space or radial trunking.

Specific, non-limiting examples of inlet, charging, outlet and discharge means for both reagent phases and the product phase(s) are further described hereinafter with reference to specific operational modes.

The skilled man will appreciate that in a chamber where there are product discharge and first liquid outlet means disposed as hereinbefore described, the charge, discharge, delivery and/or outlet rates should be adjusted to prevent overflow of product or first fluid into respectively first fluid outlet and product discharge.

The residence time of the second liquid in contact with the electrode is a function of the radial dimensions of the electrode, the shape of the electrode, the rotational speed, and the flow rate of the fluids. These parameters mutually interact and affect the residence time. For example, where the radius is increased and the other parameters kept constant the residence time is increased; where the flow rate is increased and the other parameters kept constant the residence time is reduced; where the rotational speed is increased and the other parameters kept constant the residence time is reduced. The skilled man will adjust these parameters as desired by routine trial and error.

The minimum speed at which the electrode is rotated is often also determined by the flow characteristics of each liquid. The maximum speed at which the electrode may be rotated is governed by the mechanical strength of the electrode, and/or of each rotatable member. Where the electrode is a disc, the speed of rotation will often be: for a disc of 0.5 meters diameter, 1000–3000 rpm; for a disc of 1 meter diameter, 500–2000 rpm; for a disc of 1.5 meters diameter, 400–1000 rpm. Average centrifugal acceleration of the liquids is then typically in the range 20 to 1000 g.

In order to put into effect the process of the present invention (described hereinbefore) the electrode assembly is used in an electrochemical cell. It is often preferred that the second liquid phase is charged to the electrode in such a manner that the liquid spreads as a thin film over one face of the electrode, for example a film as little as 5 to 30 micron thick. (For this purpose it may even be preferable where the electrode is a disc for the electrode to be dished slightly on that face to maintain electrode-second fluid contact). The use of such thin-film embodiments has the advantages of promoting the electrode reaction by maximising the specific surface area of reaction of the second liquid and, where the electrode chamber is in fact a cell (containing both cell electrodes), of keeping the electrode reactions well separated. It is possible in some applications of the present apparatus to minimise catholyte-anolyte side reactions adequately in this way, so that the use of a conventional electrode chamber ion-permeable separator is unnecessary. Where this is not the case, or where it is desired or necessary to have different catholyte and anolyte, such a separator is needed to define separate electrode chambers, for example a (micro)perforate inert membrane such as a PTFE (Gortex) gauze with a common electrolyte, or an ion-specific ion-permeable membrane such as a Nafion membrane with different catholyte and anolyte.

If used, such a separator will clearly form part of the containing means and is conveniently held in place by rotatable members similarly to the electrode itself, as hereinbefore described.

Any separator will generally conform to the electrode(s) and rotatable member(s), and thus preferably is in the form of a disc or an annulus which is coaxial and coextensive with a similar electrode, and which in operation is also rotated about its central axis, as part of the cell.

Typical cell outer diameters are those given for the present electrode assembly hereinbefore, i.e. diameters typically in the range of 250 mm to 1.25 m.

It is preferred to maximise the ratio of the electrode area to the volume of electrolyte in the cell to minimise cell internal resistance and so to maximise the ratio of the working current to the volume of electrolyte. Thus for a discoidal or annular cell and corresponding electrodes of a given diameter, it is preferred to make the cell chamber or chambers lamelliform and as axially thin as possible within practial constraints. (This is a further reason why the thin-film embodiment of the process of the present invention is preferred).

One such practical constraint on the axial thinness of the chamber is imposed by the thin-film process embodiment itself. Thus, in order to enhance the uniform distribution of the second reagent phase as a thin film over the face of the electrode of the present invention, it is often desirable to provide that face of the electrode with an axially projecting weir. The axial dimension of such a projection will clearly limit the axial thinness of the cell or electrode chamber; for example it may necessarily be 5 to 30 mm thick. However, if it is acceptable to omit the weir for whatever reason, the relevant chamber may be as little as 0.5 to 3 mm thick.

Typical operational current densities may vary widely with the cell dimensions and the electrolyte and reagent systems used, but will often be in the range of 0.06 to 60, e.g. 0.2 to 20 $kA.m^{-2}$. With the thinner lamelliform cells referred to above, current densities in the range 0.6 to 60, e.g. 2 to 20 $kA.m^{-2}$ may be achieved.

The potential across the cell necessary for operation at the above current densities will vary enormously with the specific fluids and reaction system, but may readily be determined by the skilled man without undue experimentation.

Some limits will be placed on the typical operating temperatures of the present electrode assembly or cell by the freezing and boiling points of the reactant phases. Subject to these parameters or the temperature sensitivity of any chosen organic phase, operating temperatures in the range of 5° to 90°, e.g. 10° to 70° C. may be used. Temperatures at the lower end of the range will tend to require the apparatus to be cooled, since the relatively large electrical power densities which may be used tend to heat the cell, especially at the higher power densities. We have found that unusually the selectivity of several reactions is enhanced by higher operating temperatures. If necessary or desirable either or both liquid feedstocks may be preheated, e.g. electrically or with steam.

A plurality of (generally identical) cells may conveniently be joined in series electrically in a series cell cascade, i.e. a bipolar arrangement. This offers a number of advantages, especially when the cells are of the foregoing discoidal or annular lamelliform type. The cells may conveniently be arranged to have a common rotational axis, so that they may be rotated by a common driveshaft.

The compactness of such a coaxial bipolar arrangement may be much enhanced by mounting the series of cells axially contiguous in a cell press, and even further enhanced by providing adjacent cells with a common conductive wall which is the cathode of one cell and the anode of the next. Such an arrangement has the added advantage of eliminating the material and maintenance costs associated with the low-resistance bus-bars necessary for parallel cell banks. It is particularly convenient to design the number of cells in the cascade so that the operational voltage drop across the cascade corresponds to a conventional industrial supply voltage, for example 440 v.

Simple routine experiment will readily reveal a suitable specific arrangement for any combination of desired rotational speed, fluids, product and reaction system.

Accordingly the invention further provides a series cell cascade for electrochemical reaction between two liquid phases characterised by comprising at least two electrode assemblies in accordance with the present invention.

The cascade will in general comprise a plurality of identical present electrode assemblies and cells in which the electrodes are of the same polarity. Favoured and preferred cells assemblies and components thereof and materials therefor in the cascade are as so described hereinbefore.

It will be appreciated that in a bipolar series cell press each series of any liquid charging or delivery means, and any gas collecting means for a given series of like electrodes, will generally be in parallel from a manifold. All these means will generally be at or near the inner periphery of each cell or electrode chamber (in particular if operated in accordance with Embodiment A as hereinbefore defined), so that each manifold will lie along or near the rotational axis of the press/cascade.

Similarly, each series of liquid outlet or discharge means through the outer peripheral wall of each cell or electrode chamber (e.g. in Embodiment A operation) will generally be in parallel into a manifold, each of which may lie parallel to the rotational axis, and which forms part respectively of an outlet or discharge space as described hereinbefore.

Liquid outlet or discharge means through an axial wall of each cell or electrode chamber (e.g. near the outer periphery in Embodiment A operation) will of course thus pass through an electrode into the adjacent cell. The outlet or discharge may if desired be isolated from the contents of the adjacent cell by running a pipe from the outlet or discharge aperture into a manifold as in the preceding paragraph.

However, this may not be necessary, since the leakage currents between adjacent cells in the press/cascade along the path thus provided through the electrode (in particular through the electrolyte outlet) will not often be a practical problem, for the following reasons: As mentioned hereinbefore, the first liquid phase will generally be the main transporter of electrical current in the process of the present invention, i.e. it will have the higher electrical conductivity. Nevertheless, the concentration of electrolyte in the first liquid phase of the present process will generally be low compared with that used e.g. in the industrial electrolysis of brine, and/or the electrolyte will comprise ionic species of relatively low transport number, so that the specific resistance of this liquid phase will be relatively high, e.g. 2 to 15 times higher than that of industrial brine. Also, in a number of processes a product of one of the electrode processes is water, so that the discharged liquid phase is even further diluted.

Additionally, the high conversion rate and specificity of the typical electrochemical reactions for which the apparatus may be used, together with the relatively high profit margins on the typical products will generally outweigh the power costs of the reaction, including waste costs. Any leakage current between adjacent cells in the cascade will not be sufficiently large to compete with that through each cell, and hence will not short out any cell to an extent which materially affects the desired reaction. It is in any case often beneficial to operate typical processes at slightly elevated temperatures, and any power dissipated by any such leakage currents contributes usefully to the heating of the apparatus and hence the reaction.

As mentioned hereinbefore, the organic second liquid phase generally has negligible conductivity, so that any such corresponding leakage currents do not pose a material problem.

Thus, discharge means and/or first liquid (electrolyte) outlet means in an electrode chamber axial wall may communicate into the adjacent electrode chamber, so that all the discharge means and all the outlet means respectively will be hydrodynamically and, if the relevant fluid is conductive, electrically, in series through the cell cascade, and will discharge or outlet into a terminal discharge or outlet space respectively. (It will of course be appreciated that where a separator defines an electrode chamber (and is thus an electrode chamber wall), then, where the discharge and/or outlet means are to be in series, all the separators must be correspondingly perforated).

Notwithstanding that the consequential leakage currents (as referred to immediately above) may be tolerated, it is advantageous that these means be so designed and arranged as to reduce these leakage currents across cells.

Thus any connection between electrode chambers in adjacent cells, whether direct or through a manifold may be relatively highly resistive, especially where it is for the first liquid phase. Thus e.g. any such connection may be of maximised length and of minimised cross-section, insofar as is compatible with the need to achieve practical flow rates, and with reaping the benefit of the advantageously high throughput to bulk ratio provided by the apparatus of the present invention.

For example, any means for delivering the first phase to the electrode chamber and any discharge means in a peripheral electrode chamber wall, which communicate in parallel with a manifold and so form a potential conductive path between cells in the cascade, will often be of maximised length and/or minimised total cross-section subject to the foregoing proviso, e.g. one or more long, narrow pipes or ports, although the examples given are not to be taken as limiting.

Where each series of liquid outlet or discharge means through an axial chamber wall is electrically in series as described above, (in particular for the electrolyte outlet means), the ionic electrical path e.g. between the cathode of one cell and the anode of the next but one may be further lengthened by disposing members of the same and/or the other series in adjacent electrodes in the cell cascade/press as far axially out of register as possible. Under rotation the electrolyte (and the organic phase) will tend to flow not only radially but also circumferentially within each cell between the relevant apertures. Rotation thus advantageously assists outlet and discharge.

In operation of the present cell cascade the second (organic) phase moves radially (or in the above case spirally) out across the rotating electrode from the point of charging and becomes progressively enriched with, and eventually converted substantially to, the desired product. Where this second/product organic phase of radially changing composition is denser than, and hence flows outwards faster than the first phase, it is discharged radially more outwardly than the circulating first (electrolyte) phase, e.g. through an electrode chamber wall at a radially outer position. The first phase will often be discharged at a radially more inner position, e.g. through an orifice in an axial wall of the electrode chamber, e.g. in the electrode itself.

A proportion of the second phase flowing over the electrode surface will tend to be also carried through this orifice, and will then continue to flow radially e.g. across the other surface of the electrode into which the orifice runs. In the preferred cascade/press, this may lead to reduced percentage conversion and/or reaction specificity, if the through-flow is susceptible to a side-reaction at what is effectively the other electrode in the overall process, e.g. if a second liquid phase undergoing anodic oxidation and/or the product is susceptible to cathodic reduction, or e.g. (vice versa) at worst a cathodic product or mixture containing it is anodically oxidised to carbon dioxide or other oxidation products.

Such disadvantageous through-flow may be minimised by providing the discharge orifice with a surrounding lip of suitably inert or resistant material projecting from the electrode surface clear of the thin film of the second and/or product phase, e.g. by 250 to 750μ. First reagent phase and any product will tend to flow radially and circumferentially (i.e. spirally) past this lip without flowing into the orifice in the process conditions of the present invention.

It is believed that molar conversion rates of 80%, and often 90%, can be further improved on in these ways.

The present invention also provides a process for effecting electrochemical reaction between two liquid phases, characterised by charging the second liquid phase in parallel to a plurality of rotating electrode assemblies of the present invention in which the electrodes are of the same polarity in a series cell cascade.

The present processes may be employed in any electrochemical reaction between two liquid phases; inter alia for continuous-mode electrosynthesis; for fuel cells, where the present apparatus is particularly advantageous in ensuring intimate reactive contact between liquids and, less typically, for the reduction of the overpotential required to discharge species in the first fluid phase, by removing those species by reaction.

In the first instance the planned product(s) of a specific electrochemical reaction will generally be collected. Examples of such reactions include the cathodic reduction optionally with dimerisation of any reducible second liquid phase with hydrogen ion, such as phases comprising species which contain optionally substituted alkane-1,1-diyl or oxo or thiooxo groups bonded to carbon, nitrogen, phosphorus or sulphur atoms. Examples of such reactions also include the anodic oxidation of any oxidisable second liquid phase with for example alkanoate, amide, hydroxide or halide ion; the second liquid phase may advantageously comprise unsaturated species such as alkenes, or other oxidisable organic species such as aromatic nuclei, e.g. optionally substituted benzene.

Further features of the apparatus of the invention will now be described in terms of an Embodiment A (defined hereinbefore) cathodic inter-phase reaction with the corresponding anodic reaction generating a gaseous product. Similar considerations will apply mutatis mutandis to other embodiments, such as those mentioned hereinbefore.

The specific reaction considered is the electrosynthesis of adiponitrile from acrylonitrile by electrohydrodimersiation. (The reaction is described generally in 'Adiponitrile via Improved EHD,' D. E. Danly, Hydrocarbon Processing, April 1981 which is incorporated herein by way of reference).

The first liquid phase is a continuous bulk electrolyte which fills a cell comprising a cathode assembly in accordance with the present invention, and is often aqueous disodium hydrogen phosphate. The cathode is charged with the second liquid phase, acrylonitrile, which is dimerised and reduced in a thin film on the cathode to adiponitrile, as:

$$2CH_2{:}CH.CN + 2H^+ + 2e^- \rightarrow NC.(CH_2)_4CN$$

At the anode hydroxyl ion is converted to oxygen and water:

$$4OH^- - 4e^- \rightarrow O_2 + 2H_2O$$

The total cell reaction is:

$$4CH_2{:}CH.CN + 2H_2O \rightarrow 2NC(CH_2)_4CN + O_2$$

It will be seen that the first liquid (electrolyte) phase is depleted as organic feedstock (second liquid phase) is converted to the desired product, and will require to be resupplied.

In further detail:

The reaction is most suitably carried out in a bipolar series cell cascade/press of the type described generally hereinbefore and in more detail hereinafter, although the reaction has been carried out in a single cell. Suitable and preferred dimensions and operational parameters for either apparatus are as so described hereinbefore.

Thus, typical cell outer diameters are those given for the present electrode assembly hereinbefore, i.e. diameters typically in the range of 250 mm to 1.25 mm.

Similarly, a high specific electrode area is preferred to minimise cell internal resistance and so to maximise the ratio of the working current to the volume of electrolyte. Thus, a preferred cell or press is discoidal or annular, with corresponding electrodes of one of the above diameters, and in which the cell chamber or chambers are lamelliform and as axially thin as possible within practical constraints. (The process carried out using such apparatus is thus the preferred thin-film embodiment of the process of the present invention.

The skilled man will appreciate that care should be taken that the cell is not so thin that the anode reaction interferes with the desired cathode reaction. From the stoichiometry of the overall process, it will be seen that there may be a risk of unwanted side-reaction such as the oxidation of the adiponitrile product.

The cathode may be formed of a single material or be a composite of two or more materials in an appopriate disposition in or on another, and may suitably be any of the following materials or combination thereof:

any metal, doped metal or alloy which is chemically resistant to this reagent system, such as stainless e.g. titanium steels, and which may be electro-catalytic such as lead, silver, cadmium, tin, copper, nickel, titanium, rhodium, niobium, tantalum, platinum and palladium, and mixtures and alloys thereof, favourably lead, silver, cadmium, in particular lead doped with about 1% silver; or any conductive or conductively coated plastic or ceramic, which may be coated with e.g. one of the above electrode materials.

The skilled man will appreciate that routine care must be taken in the selection of the cathode material. From the stoichiometry of the cathode process, it will be seen that there are a number of potential side-reactions, such as the production of propionitrile and propylamine, and these may be enhanced at the expense of the desired product by some cathode materials.

The anode in the same cell may be of the same type of materials as the present cathode, e.g. any metal, metal mixture (e.g. doped metal) or alloy which is chemically resistant to the e.g. phosphate electrolyte and the oxygen anodic by-product, such as stainless e.g. titanium steels or even mild steels.

Typical operational current densities for this electrolyte and reagent system in a thin lamelliform cell, as referred to above, will often be in the range of 0.6 to 60, e.g. 2 to 20 $kA.m^{-2}$.

The potential across the cell necessary for operation at the above current densities will readily be determined by the skilled man without undue experimentation.

Operating temperatures in the range of 5° to 90°, e.g. 10° to 70° C. may be used. Towards 10° C. the apparatus needs to be cooled, in view of the relatively large electrical power densities used, we have found that unusually the selectivity of this reaction is enhanced by higher operating temperatures within these ranges. The reagents may be preheated, e.g. electrically or with steam.

The skilled man will appreciate that routine care must be taken in the selection of the appropriate reaction parameters. For example gross stoichiometric mismatch of reagent feed rates may enhance any of the potential side-reactions, such as the production of propionitrile and propylamine, at the expense of the desired product.

A typical electrolyte for this reaction comprises:

| | |
|---|---|
| $Na_2HPO_4.12H_2O$ | 10% |
| $Na_2B_2O_7.10H_2O$ | 2% |
| Na EDTA | 0.5% |
| tetrabutylammonium hydroxide | 1% |

(all by weight) adjusted to pH7 with orthophosphoric acid. These quantities are not however crucial.

(As noted hereinbefore, for the electrode assembly of the present invention, rotation of the cell and in particular the anode with the cathode assembly (e.g. by virtue of the anode being clamped axially against but spaced from the cathode in a bipolar arrangement in a cell press) also usefully reduces anodic polarisation potential by removal of oxygen bubbles).

If desired, the anode may be charged with a suitable reductant, such as hydrogen to reduce the hydroxyl ion to water and so further reduce energy expenditure by removing the oxygen overpotential from the energy requirements. The anodic reaction is then:

$$2OH^- + H_2 - 2e^- \rightarrow 2H_2O$$

and the total cell reaction:

$$2CH_2:CH.CN + H_2 \rightarrow NC(CH_2)_4CN$$

In view of the risk of reduction of the nitrilic product, such a process is best effected in a separate anode compartment as hereinbefore described.

Typically the aqueous phase contains a phase transfer catalyst such as tetrabutylammonium hydrogen sulphate or hydroxide.

Figure 2:
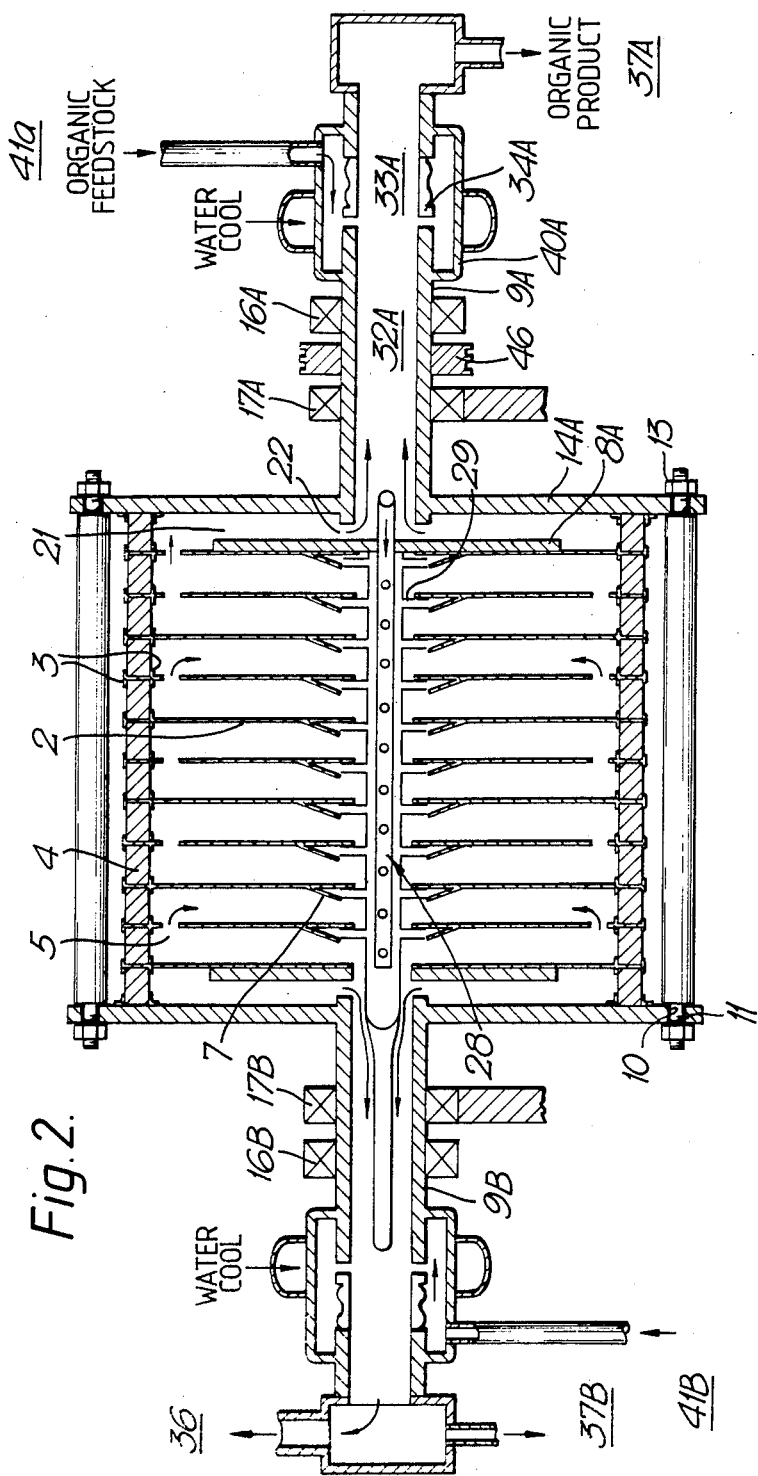
Figure 3:
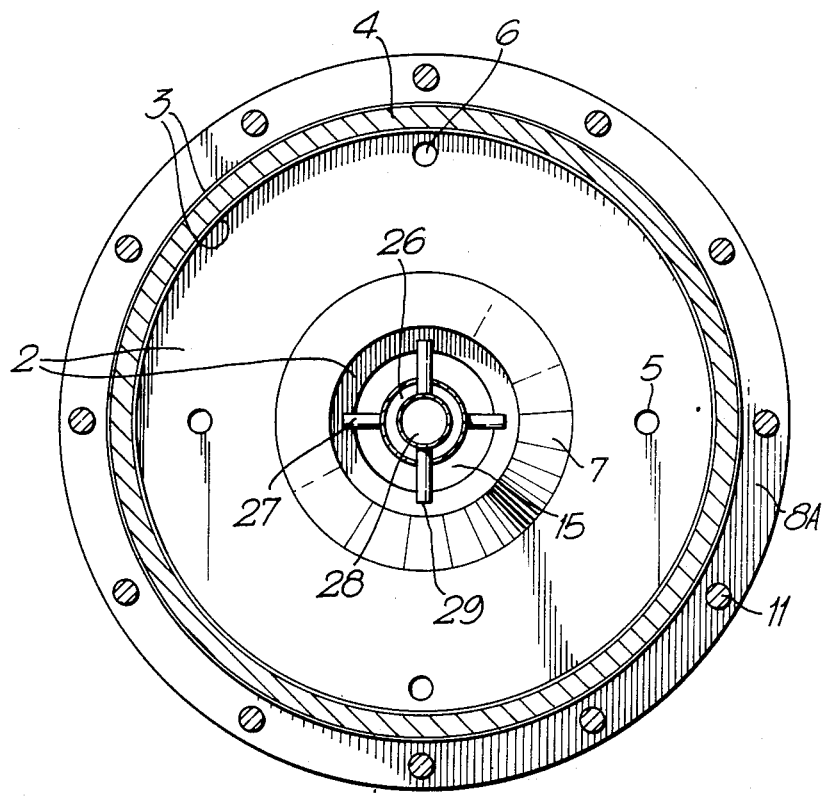

The invention is further described with reference to the accompanying drawings in which FIG. 1 is a longitudinal section of a cylindrical series cell cascade comprising a plurality of electrode assemblies in accordance with the present invention;

FIG. 2 is a longitudinal section of the cascade of FIG. 1 rotated through 90° as if to roll it towards the viewer; and FIG. 3 is a transverse section of the cascade of FIG. 1 along the line AA, viewing as shown.

In FIGS. 1 and 2 a series cell cascade 1 is made up of a series of identical repeat unit cells each of which is formed by a conductive dynamically balanced disc electrode 2 of a chemically resistant metal or alloy such as titanium or a stainless steel or a composite of two sheets, one of lead, silver and/or cadmium, in particular lead doped with about 1% silver as the cathode (first) face, and the other of mild steel as the anode (second) face, with a pair of peripheral annular lips 3 on the first face (that facing left in FIGS. 1 and 2). the lips housing an insulative annular gasket 4 of uniform thickness. The gasket 4 is also housed into corresponding lips 3 on the opposing second face (facing right in FIGS. 1 and 2) of the disc 2 of the adjacent repeat unit cell.

Thus, in each cell two sequential discs 2 and gasket 4 define a cell chamber for retaining a first fluid phase in contact with one electrode (cathode) disc 2, the disc cathode 2 of one cell being the anode of the adjacent cell and forming an anode-cathode bridge between adjacent cells.

The radial position of discharge or outlet of either reagent phase and of any separate product phase will be determined by the relative density of that phase. In the present case of the electrohydrodimerisation of acrylonitrile to adiponitrile a single organic phase is formed comprising product and organic reagent in mutual solution, which is less dense than the electrolyte first phase. In FIG. 3, each disc 2 has a first pair of diametrically opposed circular or arcuate apertures 5 (also shown in FIGS. 1 and 2) disposed near the lips 3. and a similar second pair of similar apertures 6 (also shown in FIGS. 1 and 2) at right angles to the first pair and disposed further from the axis of the disc 2 than the first pair 5. The apertures 5 form a discharge means for removing the organic cathodic reaction product of the first and second liquid reactant phases from the cathode assembly. Similarly, the apertures 6 form an outlet means for removing excess and/or diluted first liquid (electrolyte)

phase from the cathode assembly. It will be seen that the apertures 5, and more importantly the apertures 6, in the disc electrode 2 depicted in FIG. 3 are skewed at right angles out of register with respect to the apertures 5 and 6 respectively in the adjacent disc electrode 2. The same skew between adjacent electrodes 2 exists throughout the cascade 1. As noted hereinbefore, this skew is desirable since the apertures 6 containing (albeit diluted) electrolyte in use form a leakage path tending to short out the cells in the cascade. It will be seen that the skew greatly increases the length and hence the resistance of this leakage path. The disc 2 also has a central circular aperture 15.

On its first face each disc 2 (except the end disc 2' in FIG. 1) has an annular projecting weir 7 near the axis of the disc 2 (also shown in FIGS. 1 and 2).

As shown in FIGS. 2 and 1 respectively, the two end discs 2 of the cascade 1 are contacted by identical conductive disc flanges 8A and 8B of such radius that the flange 8B extends radially nearly to the apertures 6 in the end disc 2'. The flanges 8A and 8B are respectively integral with hollow half-shafts 9A and 9B which also bear integral disc flanges 14A and 14B (shown in FIG. 2 and 1 respectively) parallel to flanges 8A and 8B.

The half-shafts 9A and 9B may be respectively negatively and positively charged as described hereinafter.

The mutually opposing faces of the flanges 14A and 14B have lips 3 axially in register with lips 3 on the end discs 2 and, with the latter, housing peripheral annular gasket 4.

As shown in FIG. 1 the flanges 8B and 14B and gasket 4 define an outlet space 19, communicating via a series of circumferential holes or slots 20 with the interior 32B of the half-shaft 9B.

As shown in FIG. 2, the flanges 8A and 14A and gasket 4 define a discharge space 21, communicating via a series of circumferential holes or slots 22 with the interior 32A of the half-shaft 9A.

As shown in FIG. 1, the holes 15 in each disc 2 axially in register define a gas outlet manifold 23 communicating with the open cell 'tops' 24 and, via a series of orifices 25 disposed about the cascade axis in the flange 8A, with the interior 32B of the half-shaft 9B.

As shown in FIG. 1, each flange 14A or 14B has the same number of axial holes 10 uniformly disposed about its periphery, each fitted with an insulative grommet 11 and axially in register with a hole 10 in the other flange 14B or 14A respectively.

As shown in FIG. 2, through each axial pair of holes 10 pass elongate clamping bolts 12 with nuts 13 which may be self-locking (as shown) or provided with other conventional locking means such as locking nuts or washers or flanged washers each with a lug and set-pin (not shown). These bolts 12 and nuts 13 clamp the half-shafts 9A and 9B and the intervening cells into a rigid, rotatable cascade assembly. In each cell of the assembly each gasket 4 and each disc 2 against which it is so clamped tend to retain each other in shape and position. The assembly is rotatably mounted in insulative bearings 16A and 16B and there are means for rotating the assembly, and hence each cathode assembly, such as an electric motor and belt or fluid clutch drive (not shown). Slip rings 17A and 17B about the half-shafts 9A and 9B are means for charging the flanges 8A and 8B respectively positive and negative to each other at a desired potential difference in use, so that each pair of adjacent discs 2 in this bipolar arrangement in the series cell cascade are correspondingly positive and negative to each other across the cell defined between them at a sub-multiple potential difference which is a sub-multiple of that across the cascade between the flanges 8A and 8B.

As shown in FIG. 1, the cascade 1 is provided with an electrolyte delivery manifold 26 extending along the cascade axis and having a series of pairs of diametrically opposed radially extending delivery pipes 27 disposed such that each pair is in register with a cell in the cascade 1 clear of the weir 7 in that cell (shown in FIG. 1).

As shown in FIG. 2, the cascade 1 is similarly provided with an organic feedstock charging manifold 28 extending along the cascade axis coaxially with and within the electrolyte delivery manifold 27. The manifold 28 has a series of pairs of diametrically opposed radially extending charging pipes 29 at right angles to the delivery pipes 14'. The pipes 29 are disposed such that each pair is in register with the space between a weir 7 and the disc 2 on which it is mounted, and each pipe 29 extends through the wall of the manifold 27.

As shown in FIG. 2, at one end of the cascade 1 the interior 32A of the half-shaft 9A extending along the cascade axis communicates via the hollow interior 33A of axial bearing 34A with an organic product outlet 37A.

As shown in FIG. 1, the half-shaft interior 32A is provided with an organic feedstock feed pipe 38A running between an organic feedstock inlet port 39A (opening into the interior of a water-cooled radial bearing 40A with organic feedstock inlet 41A) and the organic feedstock charging manifold 28.

As shown in FIG. 1, at the other end of the cascade 1, the interior 32B of the half-shaft 9B extending along the cascade axis communicates via the hollow interior 33B of an axial bearing 34B to an electrolyte-oxygen separator 35 with an oxygen outlet 36 and an electrolyte outlet 37B.

The half-shaft interior 32B is provided with an electrolyte feed pipe 38B running between an electrolyte inlet port 39B (communicating with bearing 40B and inlet 41B as for 40A and 40B respectively) and the electrolyte delivery manifold 26.

In operation, the cascade 1 is rotated by driving the half-shaft 9A via a pulley or pinion 46 thereon with an electric motor (not shown) at one of the typical rotational speeds described hereinbefore.

As shown in FIG. 1, first liquid phase electrolyte containing phosphate ion at 45°–55° C. is fed to each cell in the cascade 1, from the electrolyte inlet 41B, via the bearing 40B, feed pipe 38B, electrolyte delivery manifold 26 and delivery pipes 27.

Simultaneously as shown in FIG. 2, second liquid phase organic feedstock containing acrylonitrile also at 45°–55° C. is fed to each electrode weir 7 from the organic feedstock inlet 41A via the bearing 40A, feed pipe 38A, organic feedstock charging manifold 28 and charging pipes 29. The feedstock overflows each weir 7 to spread as a thin film over the face of the disc 2 on which the weir 7 is mounted.

The cathodic flange 8B is charged positively via the slip ring 17B, and the anodic flange 8A is charged negatively via the slip-ring 17A to a potential difference of (about) 15 v. Each weir-bearing face of each disc 2 is thus a cathode and each other face is an anode. Typical operational current densities are in the range of 2 to 20 $kA.m^{-2}$, which will tend to increase the reagent temperature further.

On the weir-bearing cathodic face of each disc 2 within the cascade shown in FIGS. 1 and 2 reaction occurs between the first liquid (electrolyte) phase and the thin film of second liquid (organic) phase to produce adiponitrile.

The organic product phase containing adiponitrile and some unconverted acrylonitrile flows radially outwards across the disc 2 less rapidly than the electrolyte to near the disc periphery, and is discharged (as shown in FIG. 2) via the holes 5 into the discharge space 21 and thence via the holes 22 into and axially through the half-shaft and bearing interiors 32A and 33A to the organic product outlet 37A.

On the anodic face of each disc 2, the discharge of oxygen occurs. The oxygen flows radially inwards across the disc 2 and (as shown in FIG. 1) passes through the open cell 'top' 24 into the gas outlet manifold 23 and thence via the orifices 25 into and axially through the half-shaft interior 32B.

On each anodic face of each disc 2 and in the main electrolyte body in each cell, diluted electrolyte flows more rapidly than the organic product phase to pass (as shown in FIG. 1) via the holes 6 into the outlet space 19 and thence via the holes 20 into and axially through the half-shaft interior 32B.

Oxygen and diluted electrolyte then flow together via the bearing interior 33B into the oxygen-electrolyte separator 35, where oxygen escapes by the oxygen outlet 36 and the diluted electrolyte by the electrolyte outlet 37B.

I claim:

1. An electrode assembly for an electrochemical cell effecting electrochemical reaction between two liquid phases comprising
   an electrode, impermeable to the two phases, means for containing the first phase in contact with the electrode,
   means for charging the second phase to the electrode, and
   means for removing a reaction product of the two phases from the electrode,
   which apparatus is characterised by
   means for rotating the assembly about an axis, such that when the second phase is charged to the electrically charged, rotating electrode in contact with the first phase, the second phase moves across the electrode from the point of charging and the reaction product is removed from the electrode.

2. An electrode assembly according claim 1, wherein the electrode is discoidal or annular and bears an annular weir on its face which is in contact with the second phase in use.

3. A cell cascade comprising a plurality of electrode assemblies according to claim 1 in an axially extending array.

4. A cell cascade according to claim 3, which is a bipolar series cell cascade of lamelliform electrode assemblies.

* * * * *